No. 696,085. Patented Mar. 25, 1902.
M. B. SCHAFFER & C. H. HOWARD.
CAR WHEEL BEARING.
(Application filed Nov. 29, 1901.)
(No Model.)
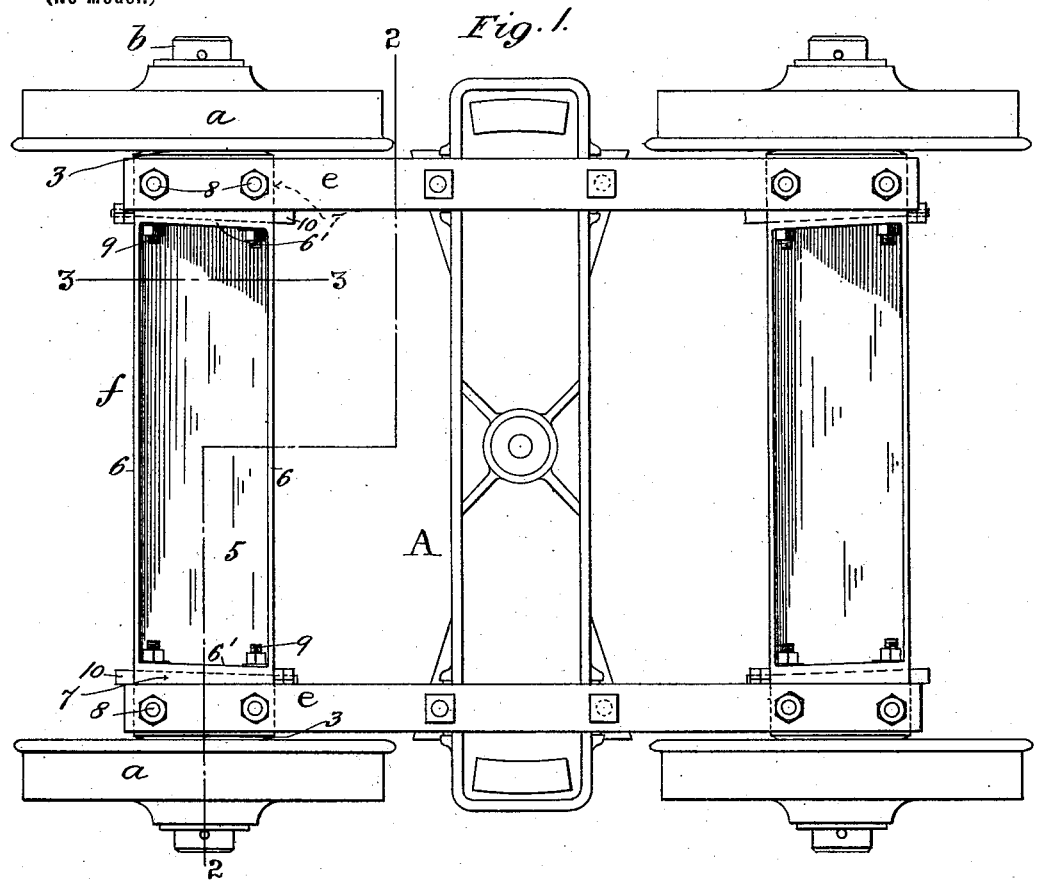
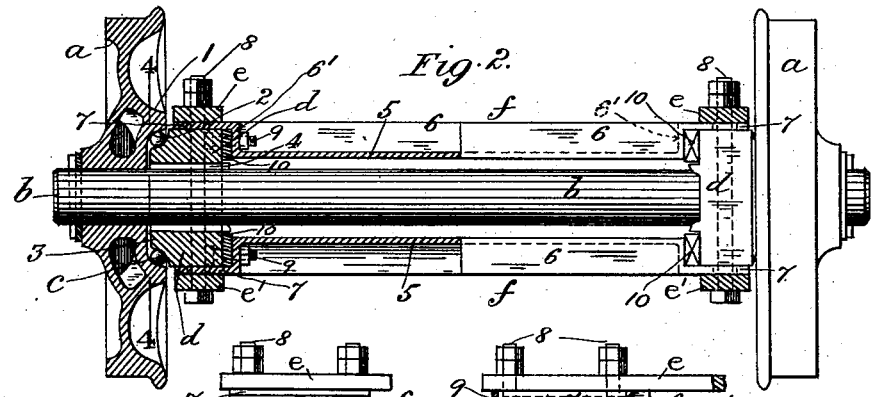
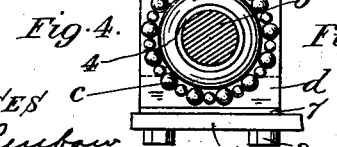
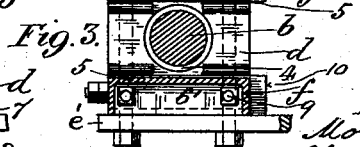
WITNESSES
INVENTORS
Morse B. Schaffer
Clarence H. Howard
By Edward W. Furrell
their atty

UNITED STATES PATENT OFFICE.

MORSE B. SCHAFFER AND CLARENCE H. HOWARD, OF ST. LOUIS, MISSOURI.

CAR-WHEEL BEARING.

SPECIFICATION forming part of Letters Patent No. 696,085, dated March 25, 1902.

Application filed November 29, 1901. Serial No. 84,054. (No model.)

*To all whom it may concern:*

Be it known that we, MORSE B. SCHAFFER, and CLARENCE H. HOWARD, citizens of the United States, residing at St. Louis, in the State of Missouri, have invented a new and useful Improvement in Car-Wheel Bearings, of which the following is a specification.

Our invention relates to a car-wheel bearing and is in the nature of an improvement on the invention for which Letters Patent of the United States were granted to Morse B. Schaffer, dated December 13, 1898, No. 615,753, for an improvement in hand-cars, wherein the car-wheel fixed on the axle is provided on its inner face with a recess concentric with the axle and containing a series of balls which are engaged by the reduced circular portion and shoulder of a collar freely surrounding the axle and having a projecting abutment which is secured to a corresponding bracket projecting from the under side of the car-bed adjacent to the wheel.

Our invention has for its object to render the wheel-bearing applicable to freight and other railroad cars, road-wagons, buggies, and vehicles in general by simplifying its construction and increasing its rigidity and durability.

The invention consists in features of novelty, as hereinafter described and claimed, reference being had to the accompanying drawings, forming part of this specification, whereon—

Figure 1 is a top plan of our improved wheel-bearings as applied to a freight-car truck; Fig. 2, a vertical transverse section through the truck on line 2 2 in Fig. 1, showing two opposite wheel-bearings and their connecting parts in longitudinal sectional elevation; Fig. 3, a vertical transverse section through the connecting parts of the bearings and axle on line 3 3 in Fig. 1, and Fig. 4 a similar view through the axle on line 4 4 in Fig. 2 with the wheel removed.

Like letters and numerals of reference denote like parts in all the figures.

$a$ represents two opposite car-wheels fixed to the axle $b$ in the usual manner. In the inner face of the hub 1 of each wheel $a$ is formed a circular recess 2, which is concentric with the axle $b$ and bears against the balls $c$, which are preferably composed of case-hardened steel and held in position around the inside of the recess 2 by the correspondingly-reduced circular portion and shoulder 3 of a preferably square-shaped block $d$, surrounding the axle $b$ and having a central hole 4 diametrically larger than the axle $b$, which passes freely therethrough, the top and bottom faces of the block $d$ being preferably opposite to and parallel with the upper and lower arch-bars $e\ e'$, respectively, of the car-truck A.

The blocks $d$ of the two opposite wheels $a$ are secured together, preferably at the top and bottom, respectively, by a brace $f$, which in the present case consists, preferably, of a rectangular-shaped plate 5, having side and end flanges 6 6', respectively, at right angles thereto, the end flanges 6' having at their outer edges outwardly-extended flanges 7 at right angles thereto and parallel to the plate 5, the flanges 7 passing between the arch-bars $e\ e'$ and blocks $d$, respectively, the whole being firmly secured together by the bolts 8, which pass through the arch-bars $e\ e'$, flanges 7, and blocks $d$, and by the bolts 9, the heads of which are preferably let into pockets in the blocks $d$, the bolts 9 passing therefrom through the flanges 6' of the brace $f$, as shown, or, if desired, the braces $f$ may be of any other suitable form and construction, such as a single piece, box-shaped, and surrounding the axle $b$, or in the form of tubular rods or bolts screw-threaded at their ends into the blocks $d$ with right and left handed threads.

Between the inside faces of the blocks $d$ and the flanges 6' are inserted tapering keys 10, whereby when the balls $c$ become worn their play can be taken up by the outward adjustment of the blocks $d$, for which purpose the holes in the flanges 7 and keys 10 through which the bolts 8 and 9 respectively pass are slottted in the usual well-known manner in such cases, the bolts 9 being of sufficient length to permit of the slackening of their nuts corresponding to the lateral adjustment of the blocks $d$.

By this construction a strong, rigid, and durable bearing is obtained for the wheels $a$, dispensing with axle boxes and brasses and their appendages.

Our improved wheel-bearing may be applied with slight modification of detail to the beds or framework of wagons, buggies, and other vehicles in lieu of to the arch-bars of a railroad-car truck, as particularly described.

What we claim as our invention, and desire to secure by Letters Patent, is—

1. In a car-wheel bearing, the combination with the arch-bars or framework of the car-truck, of an axle, two opposite wheels fixed on the axle and having respectively a recess concentric with the axle, balls within the recess, two opposite blocks surrounding, but clear of the axle, and having respectively a reduced circular portion and shoulder engaging the said balls, a brace extending between and fixed to the said blocks, and means for securing the blocks with the said brace to the said framework, substantially as described.

2. In a car-wheel bearing, the combination of the axle, two opposite wheels fixed on the axle and having respectively a recess concentric with the axle, balls within the recess, two opposite blocks surrounding, but clear of the axle, and having respectively a reduced circular portion and shoulder engaging the said balls, a brace extending between and secured to the said blocks, and means for laterally adjusting the blocks for taking up the wear of the balls, substantially as described.

In testimony whereof we have signed our names to this specification in the presence of two subscribing witnesses.

MORSE B. SCHAFFER.
CLARENCE H. HOWARD.

Witnesses:
EDWARD W. FURRELL,
GEO. L. BELFRY.